United States Patent [19]
King, Jr. et al.

[11] 3,921,305
[45] Nov. 25, 1975

[54] METHOD AND APPARATUS FOR DIGITALLY OPERATING A COMPASS CARD IN A NAVIGATION SYSTEM

[75] Inventors: Edward J. King, Jr.; Clarence Van Englehoven, both of Olathe, Kans.

[73] Assignee: King Radio Corporation, Olathe, Kans.

[22] Filed: Jan. 8, 1973

[21] Appl. No.: 321,750

[52] U.S. Cl. .............................. 33/317 D; 33/363 R
[51] Int. Cl. ............................................. G01c 17/38
[58] Field of Search .......... 33/317 R, 317 D, 363 R

[56] References Cited
UNITED STATES PATENTS

| | | |
|---|---|---|
| 2,854,763 | 10/1958 | Konet ................................. 33/317 D |
| 3,234,444 | 2/1966 | Burmeister et al. .............. 33/317 D |
| 3,465,217 | 9/1969 | Kress ..................................... 318/18 |
| 3,725,691 | 4/1973 | Delaunay ......................... 33/317 D |

*Primary Examiner*—William D. Martin, Jr.
*Attorney, Agent, or Firm*—Lowe, Kokjer, Kircher

[57] ABSTRACT

A pictorial navigation system includes a stepper motor driven compass card. Digital information is picked off of a gyro, decoded to determine direction and processed through a motor sequencer to drive the stepper motor in the proper direction for compass card rotation. Fast and slow driving rates are provided by the utilization of a digital timer and pulse rate generator.

9 Claims, 4 Drawing Figures

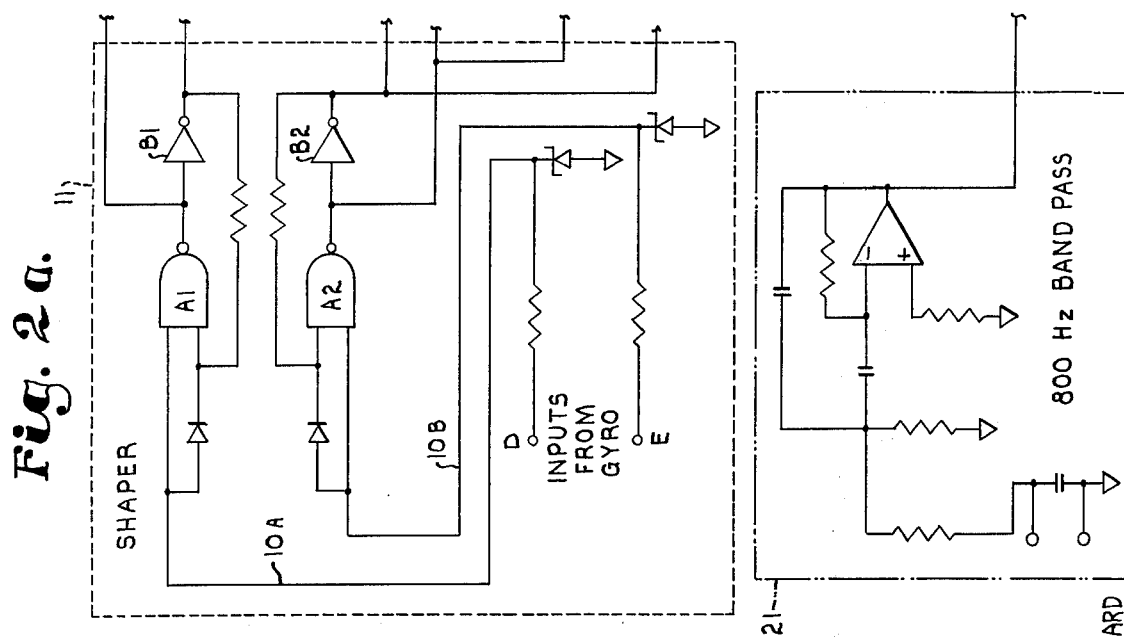
Fig. 2a.
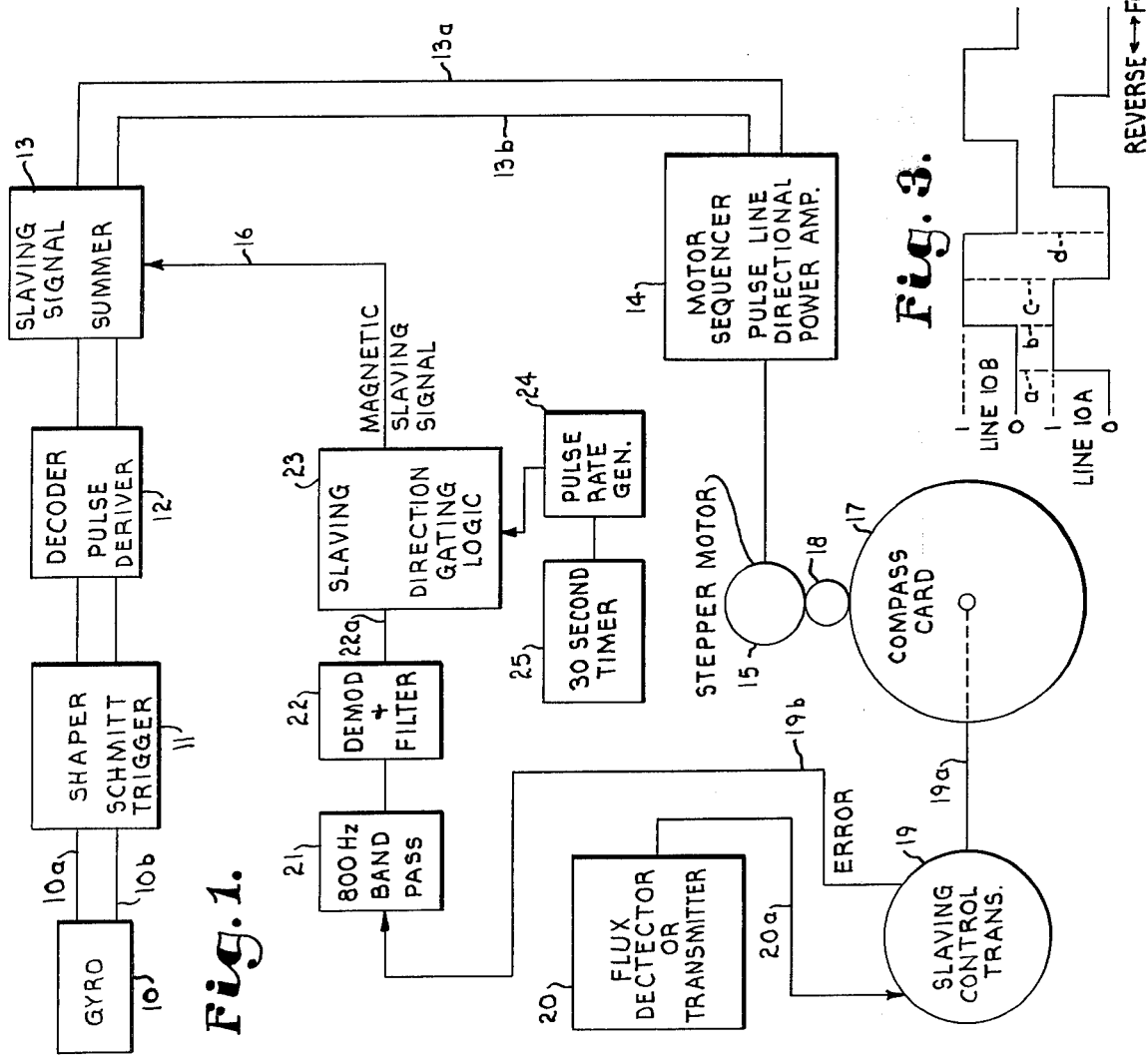
Fig. 1.
Fig. 3.

METHOD AND APPARATUS FOR DIGITALLY OPERATING A COMPASS CARD IN A NAVIGATION SYSTEM

BACKGROUND AND BRIEF DESCRIPTION OF THE INVENTION

Prior art compass systems are generally considered to have a pictorial display of the navigation situation. Such a navigation system is currently being manufactured and sold by the King Radio Corporation of Olathe, Kansas which is also the assignee of the instant invention under the product designation No. KPI-550. In the above unit, an indicator provides a pictorial display of a navigation situation and also provides controls for selected course, heading selection, RMI (radio magnetic indicator) indicator and gyro synchronization. Further the system indicator will include outputs for use with an automatic pilot or flight director, VOR receiver and additional compass loads.

A magnetic azimuth transmitter will operate to sense the direction of the earth's magnetic field and will transmit this information to the indicator and to a slaved gyro. In operation, a slaved directional gyro, remotely mounted, will operate in conjunction with the magnetic azimuth transmitter to provide gyro stabilized magnetic heading to the above described indicator. Previous systems, including the KPI-550 obtained information from the gyro by means of the heading transmitter. This device is, in effect, a synchro that is excited with a 26 volt AC potential. A three wire output is utilized therewith so that each signal is 120° out of phase and representing the pointing direction of the gimbals of the gyro.

The subject invention relates to an improved pictorial navigation system which operates to optically obtain digital information from the gyro and to utilize this digital information as quadrature encoded gray code in the display instrument or indicator. Actually, the quadrature encoded gray code will be used to feed a motor sequencer and to drive a stepper motor for the positioning of the compass card in the indicator unit. The stepper motor will take minute steps instead of the steady sweep normally associated with the prior art analog driven compass cards. The step resolution will aproximate a quarter of 1° and will not be visually discernible or a marked difference over the steady sweep resolution mentioned above.

One of the principal objects of the invention is to provide a unique method and apparatus for initiating and controlling the movement of the compass card portion of a pictorial navigation system.

A further object of the invention is to provide a unique means for effecting the stepped resolution of a compass card in a pictorial navigation system. It is an important feature of this object that the reliability and lifetime operability of the subject navigation system is improved over what has heretofore been known in similar priced equipment.

A further object of the invention is to provide a low cost compass system for use with general aviation and small aircraft. It is an important feature of this object that by utilizing an optical pick off from a directional gyro and digitizing the information received therefrom, that substantial circuitry simplification is possible in a less expensive and more reliable and efficient manner.

Another object of the invention is to provide in a compass system of the character described, a unique circuit arrangement which has provided for the elimination of a synchro output from the directional gyro along with other somewhat cumbersome and expensive electromechanical techniques. Further, the above circuitry will include a uniquely constructed motor loop which will comprise a stepper motor and associated digital decoding logic to effect the movement of the compass card in an improved and unique fashion when applied to avionics art area and more particularly to pictorial navigation systems.

A further object of the invention is to provide a digitally operated compass system which has two different rates for rotating an associated compass card. It is a feature of the invention that a pulse rate generator is uniquely associated with a stepper motor in the system to effect the different rate operation.

DETAILED DESCRIPTION OF THE INVENTION

In the accompanying drawings, which form a part of the specification and are to be read in conjunction therewith and in which like reference numerals are employed to indicate like parts in the various views:

FIG. 1 is a block diagram of the unique circuitry used to digitally effect stepped rotation of a compass card in a pictorial navigation system;

FIGS. 2a and 2b are detailed circuit schematic diagrams of the circuitry shown in FIG. 1;

FIG. 3 is a plot showing the digital quadrature encoded data appearing on lines 10A and 10B in FIG. 1.

Figure 2B:
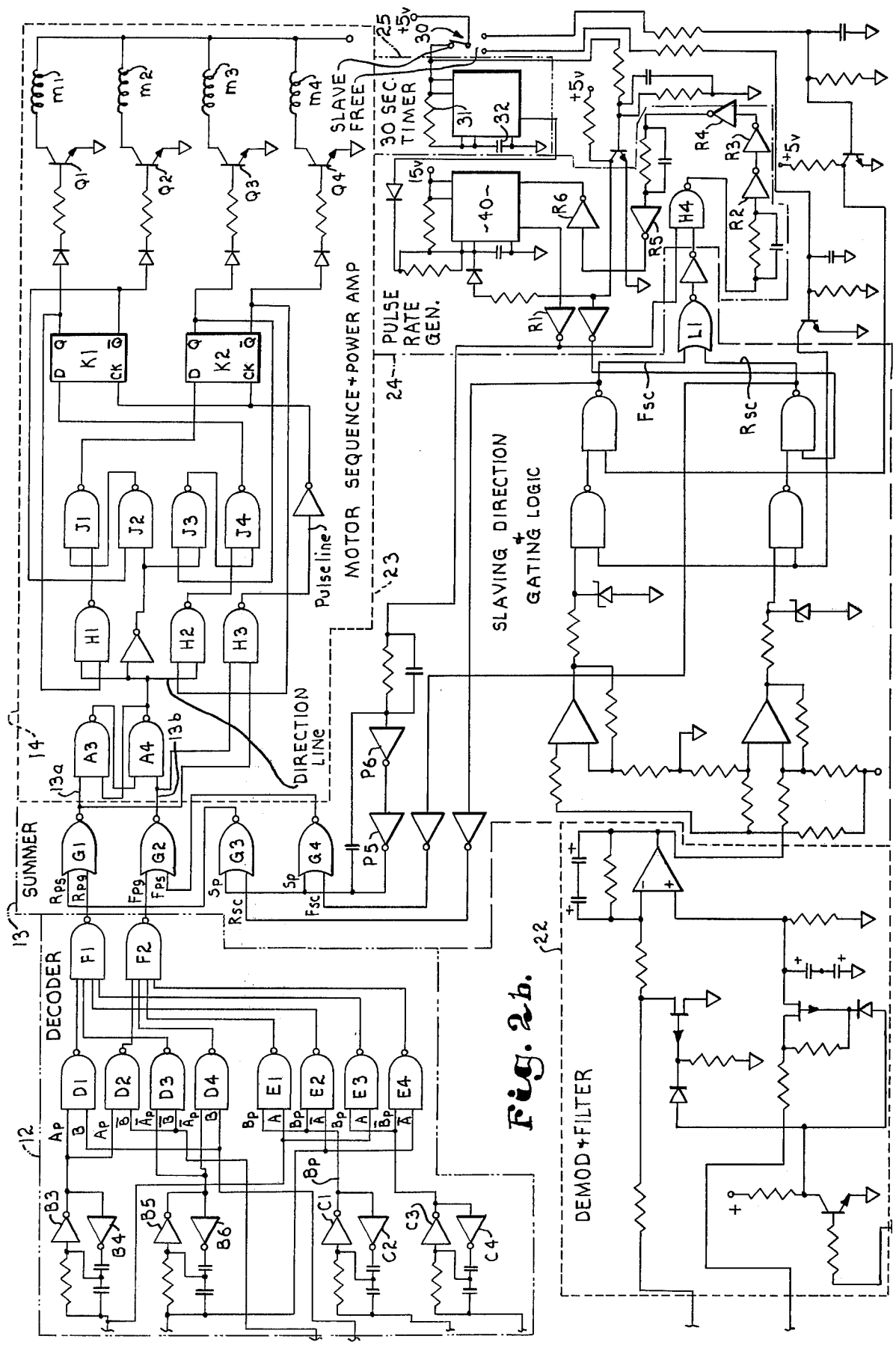

Turning now more particularly to FIG. 1, the gyro is indicated by numeral 10 in the upper left hand corner thereof. The subject gyro has a two line output indicated by the numerals 10A and 10B with the quadrature encoded gray code being transmitted thereon. Further, the pick off from the gyro will be photoelectric rather than by synchro. This is accomplished, in part, by locating a disc having holes formed therein on the gimbals of the gyro. The holes in the disc are used to produce the transitions in the gray code encoded lines by locating a light emitting diode on one side and a phototransistor on the other. As the disc turns, there will be a transition in the amount of light passing through the hole (or shutter) which correspondingly results in a transition in the photo transistor. There will be two photo transistors and light emitting diodes spaced around the disc in such a way to result in a 90° encoded signal. This signal will be indicative of the direction that the gyro is turning. (Such a gyro and optical pick off is presently being manufactured by R. C. Allen, Inc. of Grand Rapids, Michigan and is identified by the model number 16A5.) In any event, the signal on lines 10A and 10B will bear such information as to whether or not there is a change in heading and the direction in which the change is occuring. Finally, the quadrature encoded gray code is incrementally encoded in that the signal relates to a continuous change in direction per increment of time.

The signals appearing on lines 10A and 10B are shaped in the shaping circuit 11 which will include a Schmitt trigger so that every transition will be converted into a square wave pulse. In effect, each line (10A and 10B) has a shaper located thereon and will deliver the square wave output from same to a decoder and pulse deriver 12. The decoder and pulse deriver 12 operates to distinguish whether or not the pulses are transitions from a zero to a positive value or from a positive value back to zero or ground. Stated another way, the decoder operates to inform the system as to what direction the pulses are going so that a later described stepper motor will be driven in the proper direction. The output from the decoder and pulse deriver 12 is directed to a slaving signal summer 13. This summer enables the system to sum the slaving signal from the magnetic heading information into the later described motor with the gyro signal.

The output from the summer 13 is delivered to a motor sequencer 14 and will take the dual line information on lines 13a and 13b and convert same into a pulse line and a direction line (see FIG. 2b). The motor sequencer takes the pulse line and direction line and, by the utilization of a switch tail ring counter, drives the stepper motor 15 in a proper sequence. Actually, the stepper motor 15 has a gray code input thereon so that the circuit operates to convert from gray code to the direction and pulse lines and then back to gray code. This last conversion is necessary in order to be able to sum the slaving signal into the loop.

The slaving signal summer 13 has an additional input on line 16 directed thereto in the form of a magnetic slaving signal. This signal operates to slave the compass card 17 to magnetic heading information from a transmitter or detector located elsewhere in the aircraft. This transmitter may be thought of as a flux detector and is commonly utilized in avionics systems of this nature.

The stepper motor 15 operates through a gear train 18 on compass card 17. Also, a slaving control transformer 19 is mechanically linked to the compass card as shown at 19a. The flux detector or transmitter 20 has an output on line 20a that is electrically delivered to the slaving control transformer. Actually, the stator of the slaving control transformer is electrically linked to the flux detector transmitter while the rotor of transformer 19 is mechanically connected to the compass card thereby resulting in an error signal output on line 19b. This error signal corresponds to the difference between the magnetic north indication and the actual indication on compass card 17.

The error signal on line 19b is delivered to an 800 Hz band pass filter 21 to eliminate all the unwanted noise and possible interference thereon. The signal is demodulated by the demodulator and filter 22 to determine its polarity or direction of slaving error. The filter portion of the circuit 22 is added for low frequency filtering, to eliminate the high frequency changes, and to extract the low frequency components due to the magnetic transmitter swing. The signal out of the demodulator in filter 22 and appearing on line 22a now has to be processed in such a way so that it will be able to feed the stepper motor 15 in parallel with the gyro. In other words, the flux detector information is to be fed in to synchronize or slave the compass card to the magnetic heading as well as indicating short term changes. This function is accomplished by the slaving direction and gating logic generally indicated by the numeral 23.

The pulse rate generator 24 connects with the logic circuit 23 in order to produce a high slaving rate when the unit is first turned on. Since there may be considerable error in the system due to the plane location etc., a pilot wants the compass card to rapidly move to the proper position. Accordingly, the pulse rate generator will supply the signal for the desired rapid movement. However, once the card is locked onto the proper heading, a slower rate is required which actually counteracts the gyro action and other slow changing parameters. In actual practice, the fast slaving rate is approximately 360° per minute while the slow slaving rate will be 3° per minute.

The pulse generator 24 actually has two different pulse rates, a fast pulse rate and a slow pulse rate. Further, a 30 second timer 25 is utilized which changes the frequency at which the pulse rate generator runs. After 30 seconds, the timer switches the pulse rate generator to drop to the lower rate. It has been found that at a maximum of 180° off the heading, the 30 seconds is adequate to bring the card around for the slow slaving rate to take over. In any event, the pulses from the pulse rate generator are fed in and mixed with the pulses from the gyro appearing through the decoder pulse driver.

Turning now more particularly to the FIGS. 2a and 2b, the inputs from the gyro 10 are indicated in FIG. 2a as being applied to terminals D and E respectively. These inputs are in turn directed to the shaper gates A1 and A2 which are connected in a conventional manner to form a Schmitt trigger. In any event, the shaped outputs from A1 and A2 are transmitted to the decoder 12 (see FIG. 2b) and from thence to the slaving signal summer which is comprised of two NOR gates G1 and G2. The decoder (which will be described in more detail later) operates as mentioned above to process the input pulses according to the proper direction. Since the two NOR gates G1 and G2 are also conventional and state-of-the-art integrated circuits, it is clear that either the signal from the gyro or from the slaving circuit will result in a signal output to drive the motor.

The motor sequencer and power amplifier circuit identified by the numeral 14 operates to effect the operation of the stepper motor in accordance with a gray coded input. A3 and A4 form a set-reset flip-flop which holds the direction line in the proper state in such a manner that the direction line makes a transition only if a direction change is decoded, that is, there are no extraneous changes made between gyro transitions. The gates H1, H2 and H3 are NAND gates which accept input pulses in such a fashion so as to indicate that there has been a transition from the gyro. The gates J1 through J4 operate in conjunction with the flip flops K1 and K2 as feed back circuits to indicate a change of state and in which direction the change has been made. Accordingly, the flip flops K1 and K2 record the preceding event in order to drive the motor coils M1–M4 through the driver transistors Q1, Q2, Q3 and Q4. In this manner, the gray coded input coils M1, M2, M3 and M4 are energized in accordance with the transmitted code and operate to step the motor in a direction depending upon which coil is being energized.

In the system mentioned above, the information is in a digital form with the pilot attempting to drive a compass card in one direction or the other. This results in actually initiating a logic signal into the slaving direction and gating logic circuit 23 to gate the pulse rate generator signals into the motor sequencer to thereby drive compass card 17 in either a clockwise or counterclockwise direction. Also, this system enables the pilot to have two different modes of operation. This is accomplished, in part, by the positioning of the panel switch designated by the numeral 30. When the switch 30 is in the slave position shown in the diagram, the entire system operates automatically without a pilot input and slaves the magnetic heading onto the compass card. In the free mode, the magnetic slaving portion of the system is disabled and only gyro information is fed in through the decoder and into the motor sequencer. It is further shown in the circuit diagram (FIG. 2b) that the slave position indicates that the 5 volt DC is connected to the slave terminal by means of switch contact 30. When in the free position, the interconnection with the 5 volts to the slave terminal is merely disconnected and the three related terminals essentially open circuited.

The 30 second timer is a conventional off-the-shelf item and as such is of the type similar to that manufactured by the Signetics Corporation identified by number NE555V. This timer, shown within the block 25, will include the addition of a resistor 31 and capacitor 32 to contrive the 30 second time constant. Finally, the pulse rate generator 24 also utilizes a similar timer circuit but has a conventional feed back loop therearound causing same to operate as an oscillator rather than as a timer.

Turning now to details of the decoder circuit, the output signals from a gyro utilized with the subject system are shown in FIG. 3. In the subject example, it was indicated that the output signal from the gyros would appear on lines 10A and 10B as digital data quadrature encoded basically in the form shown in FIG. 3. These signals must be decoded to determine which direction the gyro has turned so that the compass card can be rotated accordingly. A forward direction will be defined as transitions progressing along the signal wave from left to right. Appropriate circuitry produces a pulse at each transition of each line. For purposes of this discussion, a transition on line 10A from 0 to 1 will be defined as $A_P$, transition on line 10B from 1 to 0 as $\overline{A}_P$, a transition on line 10A from 0 to 1 as $B_P$ and a transition on line 10B from 1 to 0 as $\overline{B}_P$. There are four transitions which would indicate that a forward movement of the gyro and identified as follows:

a. $A_P$ when B equals 0
b. $B_P$ when A equals 1
c. $\overline{A}_P$ when B equals 1
d. $\overline{B}_P$ when A equals 0

The equivalent for transitions for reverse movement are d. $B_P$ when A equals 0
c. $A_P$ when B equals 1
b. $\overline{B}_P$ when A equals 1
a. $\overline{A}_P$ when B equals 0

The equations which the decoder circuit solves are written in logic terms using Boolean algebra and may be stated as follows:

$F_P = A_P\overline{B} + B_PA + \overline{A}_PB + \overline{B}_P\overline{A}$
$R_P = B_P\overline{A} + A_PB + \overline{B}_PA + \overline{A}_P\overline{B}$ Where $F_P$ represents forward pulses and $R_P$ represents reverse pulses A = line 10A at 1; $\overline{A}$ = line 10A at 0;
B = line 10B at 1; and $\overline{B}$ = line 10B at 0

The above Boolean algebra equations and representations correspond to the circuit configuration in FIGS. 1 and FIGS. 2a and 2b. As will be seen, the circuitry which produces the pulses at the line transition consists of one shot multivibrators (all of which are of the negative edge trigger type) and inverters in conjunction with the line 10A and line 10B inputs. For example, line 10A after passing through the Schmitt trigger (the gate A1 portion) is directly connected with the (A) one shot multivibrator indicated by the numerals B3 and B4 and its associated resistors and capacitors. The B3, B4 one shot has the $A_P$ output therefrom. The inverter gate B1 inverts the 10A signal and applies same to the ($\overline{A}$) one shot multivibrator which is comprised of the gates B5 and B6. Accordingly the $\overline{A}_P$ output appears on the output of the B5, B6 multivibrator.

The 10B input (through gate A2 of a Schmitt trigger) passes through the (B) one shot multivibrator comprising the gates C1 and C2 and has the B output therefrom. Additionally, gate B2 inverts the 10B signal to a ($\overline{B}$) one shot comprising gates C3 and C4 which in turn has the $\overline{B}_P$ output as indicated on the FIG. 2b diagram.

In any event, decoder section 12 has a series of NAND gates D1, D2, D3, D4, E1, E2, E3, and E4 with the following inputs being applied thereto ($A_PB$ to NAND gate D1; $A_P\overline{B}$ to NAND gate D2; $\overline{A}_P\overline{B}$ to NAND gate D3; $\overline{A}_PB$ to NAND gate D4; $B_PA$ to NAND gate E1; $B_P\overline{A}$ to NAND gate E2; $\overline{B}_PA$ to NAND gate E3; and $\overline{B}_P\overline{A}$ to NAND gate E4.) The NOR gate F1 interconnects with the D and E NAND gates to form the $R_P$ output while the NOR gate F2 receives the corresponding pulses to form the $F_P$ output. As suggested above the $F_P$ essentially represents the forward pulses while the $R_P$ designation represents the reverse pulses.

Turning now more particularly to the magnetic slaving signal and gating logic, it should be noted that the error between the magnetically detected direction and the compass card indicated direction is phase detected to provide slaving direction and the compass card indicated direction is phase detected to provide slaving direction commands. These commands are represented by the letters $F_{SC}$ and $F_{RC}$ in the slaving direction and gating logic circuit (see number 23 in FIG. 2b) and respectively represent the forward and reverse commands.

The reverse pulses, $R_{SC}$ and the $S_P$ (slaving pulses) pulses are delivered to the NOR gate G3 which actually functions as an AND circuit. The $F_{SC}$ pulses and the $S_P$ pulses are fed into the NOR gate G4 which likewise operates as and AND circuit. Also, the $F_{SC}$ pulses and the $R_{SC}$ pulses are fed through the NOR gate L1 to initiate the slaving pulse one shot described later.

The pulses generated by gate G3 and the $R_{pg}$ (gyro pulses) are summed into the slaving signal summer by means of gate G1 (a NOR gate operating as OR circuit). The $F_{pg}$ and the $F_{ps}$ pulses are fed into the NOR gate G2 in the slaving signal summer 13. Again, gate G2 is a NOR gate operating as an OR circuit. The slaving one shot that delivers the slaving pulses ($S_p$) to the NAND gates G3 and G4 comprises gates P5 and P6 and the associated resistors and capacitors. This one shot has its input from the pulse rate generator which is actually the square wave oscillator that is formed by the timer mentioned above and indicated now by the numeral 40 (also a Signetics NE555V timer) and the feed back loop comprising the gates R1, H4, R2, R3, R4, R5 and R6 and the associated resistors and capacitors. Therefore, it can be seen that when the NOR gate L1 has an output therefrom the feed back loop is enabled and the pulse rate generator operates to activate the slaving one shot P5, P6 and to produce the $S_P$ pulses to the NAND gates G3 and G4.

Stated another way, the slaving direction command enables the pulse rate generator which produces slaving pulses through the one shot multivibrator P5, P6. The slaving pulses are gated into the proper pulse lines by the $F_{SC}$ and $R_{SC}$ commands. The slaving pulses $F_{PS}$ or $R_{PS}$ are summed with the gyro pulses $F_{PG}$ or $R_{PG}$ to produce the proper rotation on the compass card after being processed in the motor sequencer and power amplifier circuit 14.

The circuitry including the demodulator and filter 22 in FIG. 2b and the Schmitt trigger portion of the slaving direction and gating logic 23 are conventional state-of-the-art circuits including operational amplifiers and a detailed operation is not necessary for a complete understanding of the subject invention.

From the foregoing, it will be seen that this invention is one well adapted to attain all the ends and objects herein set forth, together with other advantages which are obvious and which are inherent to the structure.

It will be understood that certain features and subcombinations are of utility and may be employed without reference to other features and subcombinations. This is contemplated by an is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A pictorial navigation system having a compass card therein, said system comprising,
   a gyro,
   means for obtaining digital information from said gyro indicative of aircraft heading changes,
   a motor, said motor interconnected with said compass card and operable to rotate said compass card in either a clockwise or counterclockwise direction,
   means for decoding said digital information and for using said decoded digital information to effect the operation of said motor and the rotation of said compass card, said decoding and using means including means for magnetically producing digital information indicative of said aircraft heading, and
   means for digitally slaving said compass card with said magnetically produced information to thereby magnetically correct the displayed aircraft heading.

2. The combination as in claim 1 wherein said motor is a stepper motor having a shaft interconnected with said compass card that is positionable upon a preselected digital input, said input corresponding to said decoded information.

3. The combination as in claim 1 wherein said digitally slaving means includes a means for digitally changing the rate at which said compass card is rotated to display said magnetically corrected aircraft heading.

4. The combination as in claim 3 wherein said rate changing means includes a pulse rate generator having an output with at least two different pulse rates and a means to effect the switching of said generator from one rate to the other, said generator output operable to effect the movement of said cord to said corrected heading at two different rates of speed, said rates of speed being correlated to said output pulse rates.

5. The combination as in claim 1 wherein said decoding means includes a means for obtaining clockwise and counterclockwise compass card movement signal commands from the pulse transitions in said digital information, said signal commands operable to effect the motor rotation in a direction corresponding to desired rotation of saic compass card.

6. The combination as in claim 5 wherein said digitally slaving means includes a means for digitally changing the rate at which said compass card is rotated to display said magnetically corrected aircraft heading.

7. The combination as in claim 6 wherein said rate changing means includes a pulse rate generator having an output with at least two different pulse rates and a means to effect the switching of said generator from one rate to the other, said generator output operable to effect the movement of said card to said corrected heading at two different rates of speed, said rates of speed being correlated to said output pulse rates.

8. A method of digitally operating a compass card in a pictorial navigation system which includes a gyro therein, said method including the steps of
   obtaining digital information from said gyro indicative of aircraft heading changes,
   interconnecting a motor with said compass card,
   decoding said digital information,
   applying said decoded digital information to said motor,
   rotating said compass card by the operation of said motor in either a clockwise or counterclockwise direction depending on said decoded digital information,
   magnetically producing digital information indicative of aircraft heading, and
   digitally slaving said compass card with said magnetically produced information to thereby magnetically correct the displayed aircraft heading.

9. The method as in claim 8 including the steps of digitally changing the rate at which said compass card is rotated to display said magnetically corrected aircraft heading.

* * * * *